United States Patent
Orlick (10) Patent No.: US 7,245,326 B2
(45) Date of Patent: Jul. 17, 2007

(54) METHOD OF EDGE BASED INTERPOLATION

(75) Inventor: Christopher J. Orlick, Newtown, PA (US)

(73) Assignee: Matsushita Electric Industrial Co. Ltd., Osaka (JP)

( * ) Notice: Subject to any disclaimer, the term of this patent is extended or adjusted under 35 U.S.C. 154(b) by 791 days.

(21) Appl. No.: 09/988,934

(22) Filed: Nov. 19, 2001

(65) Prior Publication Data

US 2003/0098925 A1 May 29, 2003

(51) Int. Cl.
*H04N 11/20* (2006.01)

(52) U.S. Cl. .................. 348/448; 348/441; 348/452; 348/458

(58) Field of Classification Search .......... 348/448, 348/441, 452, 458, 619, 620; H04N 11/20
See application file for complete search history.

(56) References Cited

U.S. PATENT DOCUMENTS

| 4,731,648 A | 3/1988 | Bernard et al. |
| 4,774,581 A | 9/1988 | Shiratsuchi |
| 5,051,826 A | 9/1991 | Ishii et al. |
| 5,373,322 A | 12/1994 | Laroche et al. |
| 5,631,706 A | 5/1997 | Tsunashima |
| 5,638,139 A | 6/1997 | Clatanoff et al. |
| 5,793,435 A | 8/1998 | Ward et al. |
| 5,805,217 A | 9/1998 | Lu et al. |
| 5,886,745 A | 3/1999 | Muraji et al. |
| 5,943,099 A | 8/1999 | Kim |
| 6,037,986 A | 3/2000 | Zhang et al. |
| 6,055,018 A | 4/2000 | Swan |
| 6,229,578 B1 * | 5/2001 | Acharya et al. ........... 348/607 |
| 6,396,543 B1 * | 5/2002 | Shin et al. ................. 348/452 |
| 6,408,109 B1 * | 6/2002 | Silver et al. ............... 382/300 |
| 6,614,484 B1 * | 9/2003 | Lim et al. .................. 348/448 |
| 6,707,937 B1 * | 3/2004 | Sobel et al. ............... 382/162 |
| 6,731,342 B2 * | 5/2004 | Shin et al. ................. 348/452 |
| 6,810,156 B1 * | 10/2004 | Itoh ........................... 382/300 |

FOREIGN PATENT DOCUMENTS

| EP | 0 361 558 A1 | 4/1990 |
| EP | 0 785 683 A2 | 7/1997 |

* cited by examiner

*Primary Examiner*—Trang U. Tran
(74) *Attorney, Agent, or Firm*—RatnerPrestia (57) ABSTRACT

A method for detecting an edge and generating an interpolated edge pixel at a target pixel position between two lines of an interlace scan image first determines gradient intensities in the horizontal and vertical directions and then calculates the angle of the edge by comparing the gradient intensities. The interpolated pixel value is calculated from samples in the interlace scan image that lie along the identified angle and are proximate to the target pixel position. The method represents the gradient strengths and the difference between them as bit strings; locates the most significant non-zero bit in the larger gradient value; divides the value of the corresponding bit position in the difference string, and a predetermined number of following positions, by increasing powers of 2; sums the results; subtracts the sum from 1.0 and uses the inverse tangent function to calculate the angle of the edge.

26 Claims, 7 Drawing Sheets

METHOD OF EDGE BASED INTERPOLATION

TECHNICAL FIELD

The present invention relates generally to a method for converting interlace scan video signals to progressive scan video signals and, in particular, to a method of interpolating a value for a picture element (pixel) of an interstitial row of pixels, lying on an edge between visually distinct regions of an interlace scan video image.

BACKGROUND OF THE INVENTION

The image on the television screen consists of pixels, arranged horizontally in rows, generally offset vertically by one pixel position from one another. Each pixel is assigned three values, which indicate the respective intensities of the red, green, and blue components of the pixel. A video image is generated by sequentially displaying the rows of pixels as horizontal lines of the image.

Existing analog broadcast standards such as NTSC, PAL and SECAM use two video fields to generate a single video frame. Each field includes one-half of the horizontal lines that make up the image frame. One field includes all of the odd numbered lines of the frame and the other field includes all of the even numbered lines. Interlaced images exhibit distorting artifacts such as vertical line flicker or loss of vertical detail that degrade the resulting frame image. One way to eliminate these artifacts is to convert the interlace-scanned fields into progressive-scan frames. In a progressive-scan frame, both the odd and even image lines are displayed sequentially as a single image.

Interlace-scan to progressive-scan conversion systems are gaining importance as more television viewers purchase high-definition television monitors that can display progressive-scan signals. Both broadcast facilities and consumers may want to have interlace-scan to progressive-scan conversion capability in order to avoid the distorting artifacts of interlace-scan images.

One way to generate a progressive-scan frame from an interlace-scan field is to interpolate interstitial lines in each field. Thus, the lines of the odd field are used to interpolate even-numbered lines and the lines of the even field are used to interpolate odd-numbered lines.

Each pixel of the interpolated line (or the "interpolated pixel") is calculated based on the values of proximate pixels in adjacent interlace-scan lines. The simplest method of generating the interpolated pixel is simply duplicating the pixel from the corresponding position in the previously received scan line. For pixels which lie on a diagonal edge, this could result in "jaggies" (a line which appears to be jagged or stair-stepped, rather than smooth). For pixels which are not on an edge, such duplication could result in pixels that do not correspond to the image being displayed, resulting in a poor display to the viewer. This method also reduces the vertical resolution of the image compared to an interlace-scan image and may result in areas of the image flickering at a 30 Hz rate.

Another simple method is to set the value of the interpolated pixel as the average of two vertically adjacent pixels. However, for a pixel on the edge of two visually distinct regions, such an averaging could result in a pixel that matches neither adjacent pixel. For example, the value generated for an interpolated pixel between a blue pixel and green pixel may be cyan, which would not result in the image desired to be presented to the viewer.

Figure 1:
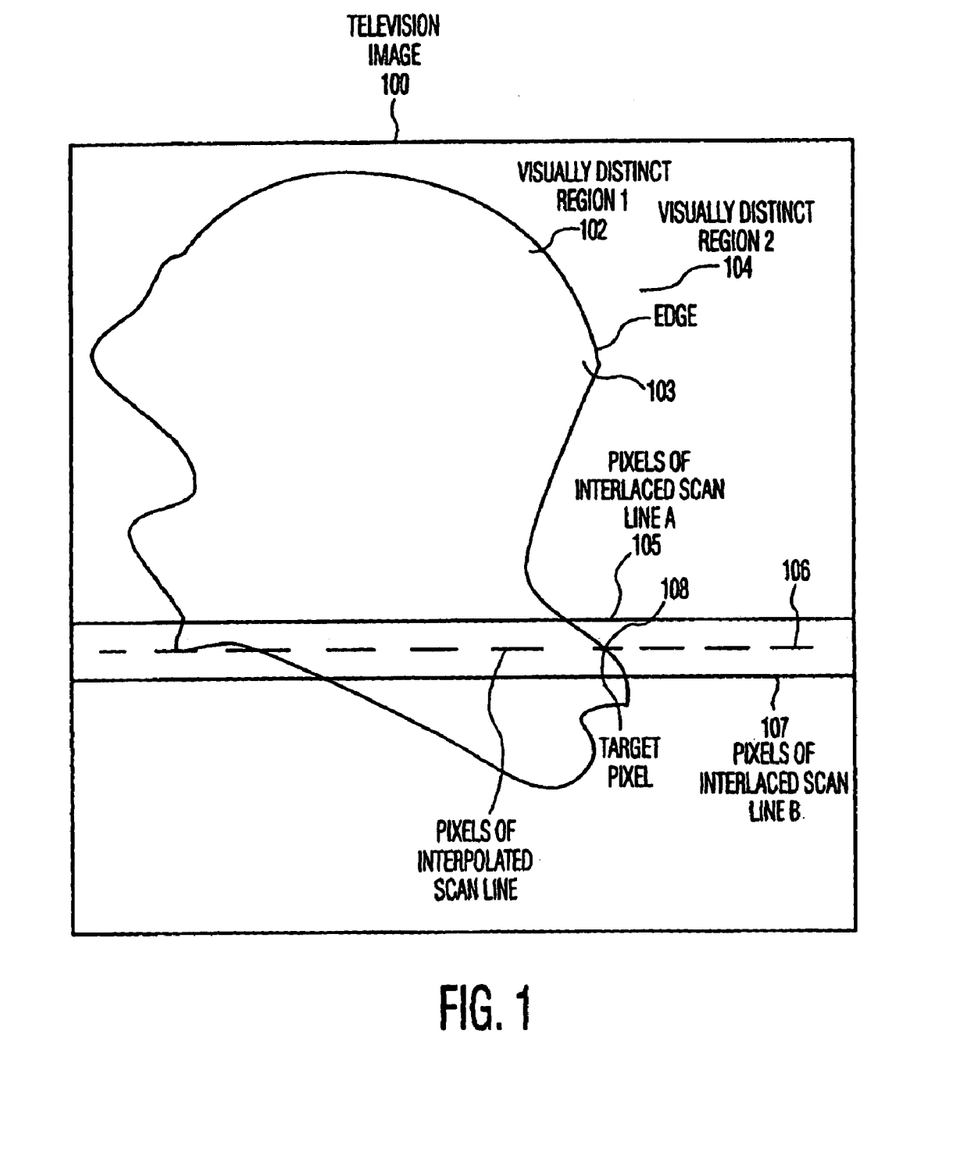
FIG. 1 is an example of visually distinct regions.

FIG. 1 shows an image on a television image 100, which includes two visually distinct regions 102 and 104. The border 103 between the two visually distinct regions is referred to herein as an edge. An image on a television screen may consist of more than two visually distinct regions, and any one or more visually distinct regions may not be entirely contained within the television screen, as is illustrated.

Visually distinct regions are defined by the edge 103 between them, in contrast to a more gradual change, such as a shadow (which may have gradations of gray and black) or light on a wall (which may have gradations of color). In generating an interpolated pixel 108 which is to be on an edge, it is desirable to consider the visual smoothness of the edge. If the value of the pixel 108 on the interpolated line 106 were based solely on the pixels proximate in the received scan lines 105 and 107, the calculated value may be a blend of the values of the two visually distinct regions, rather than a distinctive edge separating the two regions. The result could be an edge without sufficient clarity to distinguish between the two regions, a line that is not visually smooth, or a pixel that has the correct value for an edge but is displayed at the wrong pixel location.

SUMMARY OF THE INVENTION

To meet this and other needs, and in view of its purposes, the present invention provides a method for generating an interpolated pixel in an interlaced to progressive conversion system, comprising the steps of selecting a target pixel from the interlaced scan signal; determining if said target pixel lies on an edge between first and second visually distinct regions by determining gradient intensities in the horizontal and vertical directions; calculating the angle of the edge by combining the gradient intensity values using combinatorial logic; and calculating a value for a pixel from the progressive scan signal as an average of the pixels proximate to the target pixel in the direction of the calculated edge.

It is to be understood that both the foregoing general description and the following detailed description are exemplary, but are not restrictive, of the invention.

DETAILED DESCRIPTION OF THE INVENTION

The present invention relates to a method and apparatus for converting an interlace scan video signal into a progressive scan video signal, and specifically for generating picture elements (pixels) of interstitial lines in an interlaced field image, which pixels lie on an edge between visually distinct regions in the interlaced field.

Figure 2A:
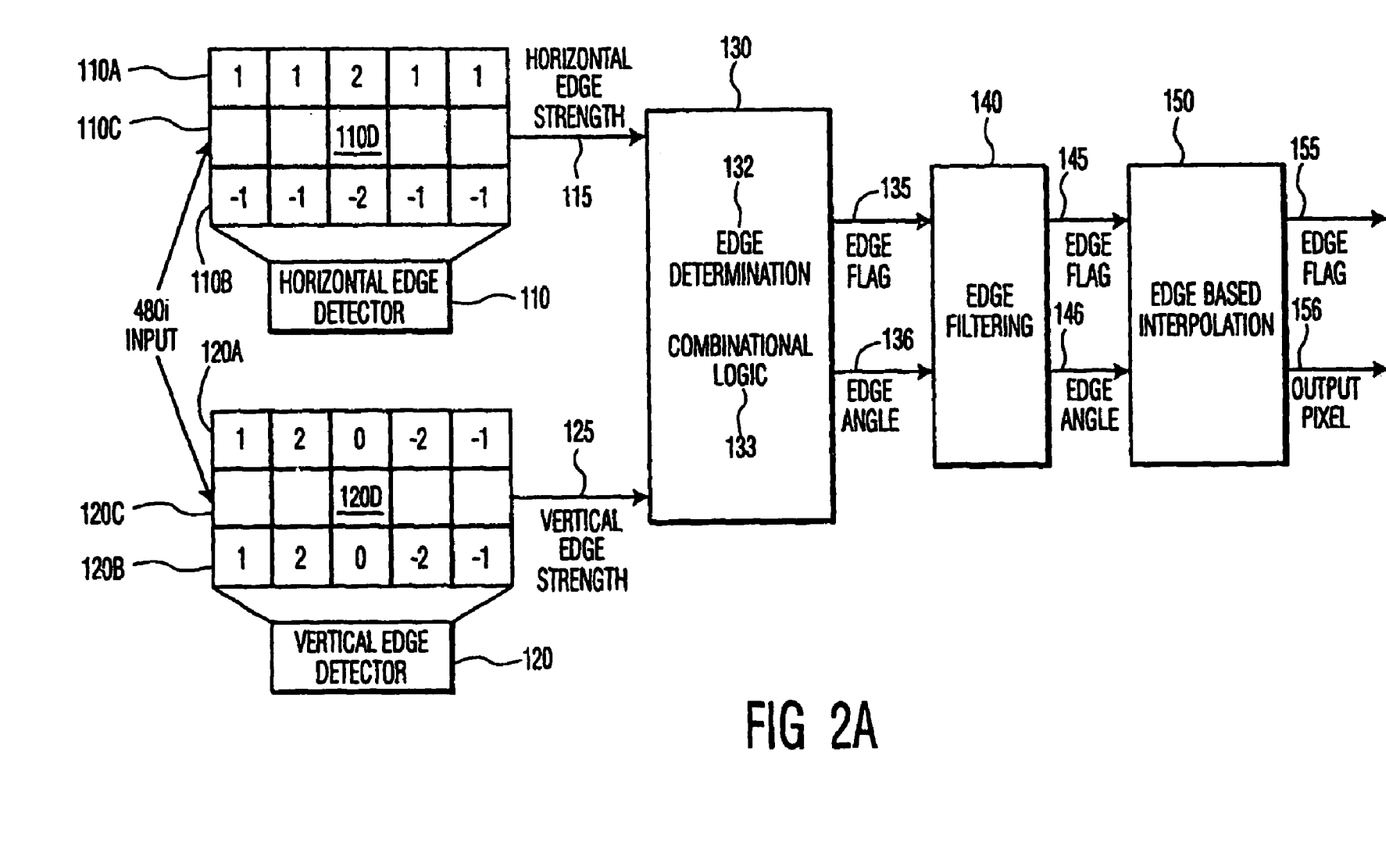
FIG. 2A is a block diagram of an exemplary embodiment of the present invention

In an exemplary embodiment of the invention shown in FIG. 2A, an arithmetic approximation technique is used to determine the angle of an edge at a particular pixel position to yield an interpolated pixel well within acceptable tolerance levels, while avoiding overhead of mathematical calculation or memory usage. The arithmetic approximation is achieved using combinatorial logic. The exemplary embodiment of the invention also allows for different degrees of precision in the result.

The exemplary embodiment uses a horizontal edge detector 110 and a vertical edge detector 120, that are specifically designed for use with interlace-scan video signals and that also serve as noise-reduction filters. Horizontal edge detector 110 and vertical edge detector 120 work by determining a numeric value, called "edge strength," representing the degree of change in the values of the pixels in the scanned rows adjacent to a target pixel.

The exemplary horizontal edge detector 110 includes two finite impulse response (FIR) filters, 110A and 110B. In the exemplary embodiment of the invention, each of these FIR filters is a five-tap filter having the coefficients shown in FIG. 2. Each of the filters multiplies five successive pixels on a line of the interlaced video signal by the respective coefficients and sums the results.

The two filters of the horizontal edge detector 110 operate on consecutive lines of one interlaced field. The output signal provided by the filter is an indication of the horizontal edge strength at the interpolated pixel position, 110D, the center position of the line 110C.

In the same way, the vertical edge detector 120 employs two FIR filters 120A and 120B to generate an output signal representing the vertical edge strength for the interpolated pixel position, the center position, 120D, of the line 120C. The filters 120A and 120B also operate on consecutive lines of the interlaced field.

The edge strengths in the horizontal 115 and vertical 125 directions in the region around the target pixel are the output signals of the edge detectors 110 and 120, respectively. The horizontal edge strength 115 and vertical edge strength 125 are evaluated in edge determination logic 130, to determine if an edge is present. An edge is present if either or both of the horizontal edge strength value 115 and the vertical edge strength value 125 exceed a threshold value.

The ratio of the horizontal and vertical gradient strength intensities is used by the logic 130 to determine the angle of the edge. The Edge Determination component 132 of block 130 sets an edge flag 135 to indicate the presence of an edge. The combinational logic component 133 of block 130 calculates the value of the edge angle 136. The edge determination component 132 of block 130 corresponds to FIG. 2C and to steps 230 through 235 of FIG. 3. The combinational logic component 133 of block 130 corresponds to FIG. 2B and to steps 240 through 270 of FIG. 3, described below.

Edge filter 140 may process the image to be displayed, for example by evaluating an "edge map" (a binary image in which all the pixels which lie on edges in the image are represented by a logic one while all other pixels are represented by logic zero). This edge map is processed in conjunction with the actual image pixels to ensure that an edge is in fact detected, and to filter out noise. If the target pixel is determined not to be on an edge, but to be an artifact of noise in the image, for example, the filter 140 may reset the edge flag 145 for the pixel and set the edge angle 146 for the pixel to a predetermined value. Edge flag 145 and edge angle 146 are used by the edge interpolator 150, as described below, to calculate the value of the target pixel. Edge interpolator 150 provides an edge flag 155 and value 156 of the interpolated pixel.

Figure 3:
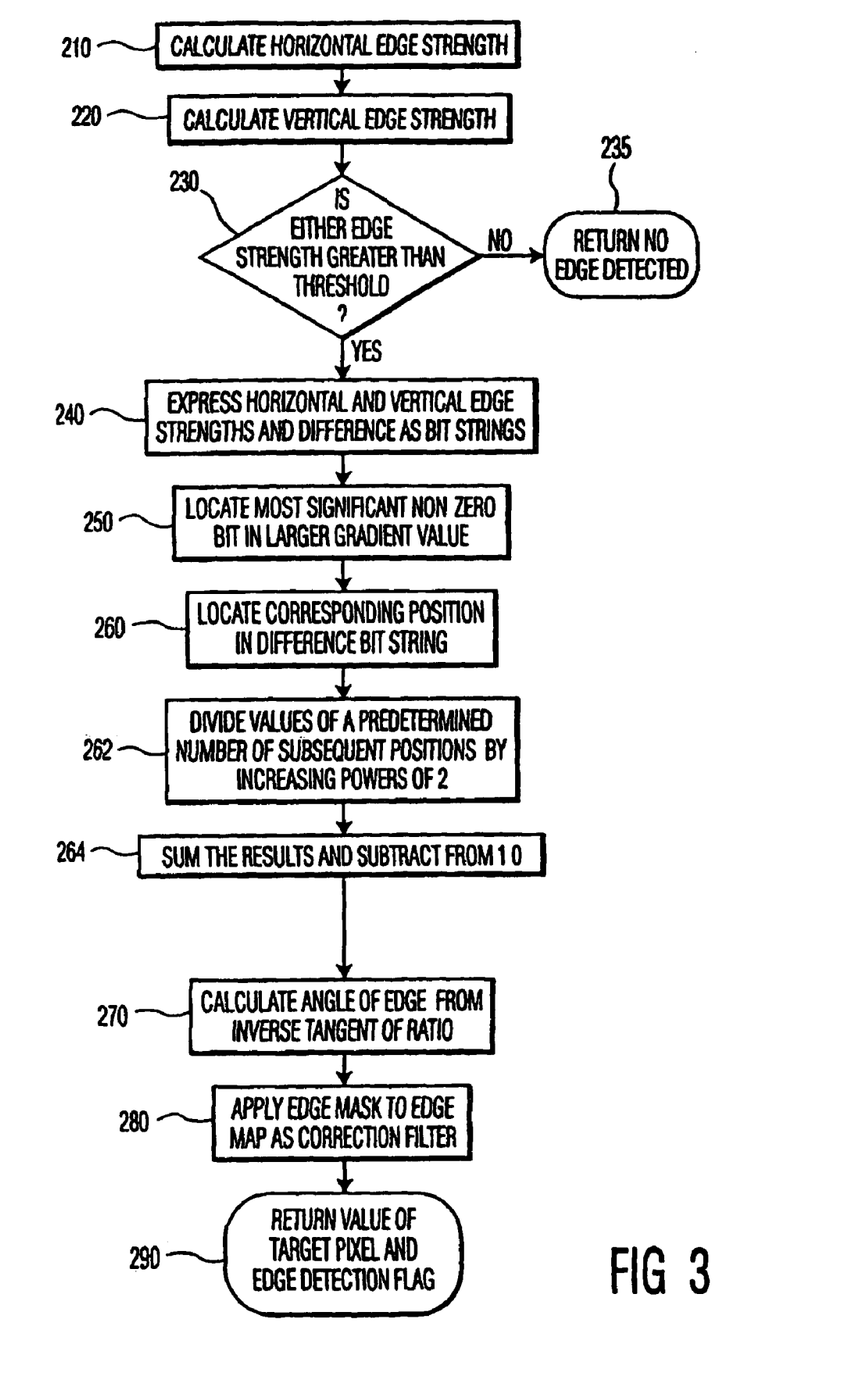
FIG. 3 is a flow diagram of an exemplary embodiment of the present invention.

The method of the exemplary embodiment of the present invention is shown in FIG. 3. In block 210, the horizontal edge strength is calculated using the filter 110, shown in FIG. 2A. The vertical edge strength is calculated in step 220 using the filter 120 shown in FIG. 2A. The horizontal and vertical edge detectors examine pixels in the interlace scan rows proximate to the target pixel, and determine the relative magnitude of changes in the intensity of the pixels. An abrupt change, for example from red to green, may indicate an edge. The values selected for the edge detectors return numeric values for the strength of this change in each direction. If the numeric value is greater than a predetermined threshold, block 230, then an abrupt change in intensity has been detected, and an edge is indicated. If the value is less than the predetermined threshold, then there is no change or a gradual change, and no edge is indicated, block 235. The relative magnitudes of the numeric values indicate whether the edge is predominantly horizontal or vertical, and, as described below, a comparison of the gradient intensities can yield the angle of the edge. By using the degree of change across pixels in the scanned row adjacent to the target pixel, an edge can be determined dynamically without the overhead of a pixel-by-pixel comparison.

One output signal of the edge determination section 132 is a flag indicating if the target pixel is on an edge in the image. As described below, the edge filtering process 140 may collect these edge flags to generate an edge map for the image. In the exemplary embodiment, the edge map is an array of one-bit values corresponding to the image field that is being interpolated, each bit indicating whether the respective pixel is an edge pixel. The edge determination method of steps 230 through 235 corresponds to the Edge Determination component 132 of block 130 shown in FIG. 2A.

As described below, the relative edge strengths of the horizontal and vertical edges may be used to determine the angle of the edge at the target pixel position. The first step in this process, step 240, is to express the magnitudes of the horizontal edge strength and vertical edge strength values as bit strings. The difference between these bit strings is calculated and also stored as a bit string in step 240. The present invention operates by examining select bits from the larger of the horizontal edge strength and vertical edge strength values and the difference value. According to the method of the exemplary embodiment, the position of the most significant non-zero bit of the greater gradient value bit string is located in step 250. The corresponding bit position is located in the difference value bit string in block 260. In step 262, the located bit positions and a predetermined less-significant bit positions are examined to determine the angle of the edge. The number of less significant bit positions that are examined varies as the level of precision desired.

As a first approximation, each difference bit represents a distinct level of difference between the two values. These levels correspond to successive powers of 2; i.e., the most significant bit is $2^{-1}$ (or 0.5), so a 1 in this position indicates the horizontal edge strength and vertical edge strength values are at least 50% different. The remaining bits express the difference between the horizontal edge strength and vertical edge strength values in decreasing powers of 2; i.e., $2^{-2}$, $2^{-3}$, $2^{-4}$, etc., or 0.25, 0.125, 0.0625, etc. Summing these values results in an approximation of the ratio of the two edge strength values, with the accuracy of the approximation varying as the number of bits to be examined. For example, an accuracy of approximately 6 percent may be achieved by checking 4 bits. If additional accuracy is required, the number of bits can be increased, with each additional bit halving the error. The summation of the difference levels yields the ratio between the difference and the larger gradient value.

The inverse tangent function may be used to calculate the angle of the edge at the target pixel. For the inverse tangent function, the required ratio is of the horizontal edge strength to the vertical edge strength. To approximate this, the summation of the percentage differences calculated above is subtracted from 1.0, in step 264, and the inverse tangent applied at step 270 to yield the angle of the edge. The edge calculation method of steps 240 through 270 corresponds to the Combinational Logic component 133 of block 130 in FIG. 2A. In one exemplary embodiment of the invention, the inverse tangent function is applied using a look-up table. The output value provided by this look-up table is not an actual angle but a coded value indicating a particular edge angle. For example, a value x"001" may indicate an angle of 22.5°, x"010" an angle of 30°, x"011" an angle of 45°, x"110" an angle of 60°, and so on.

As described below with reference to FIGS. 6A through 6D, the ratio of the larger edge strength to the difference value may represent an angle of less than 45° or greater than 45°, depending on whether the vertical or horizontal edge strength is larger, respectively. The combinatorial logic 133 determines the appropriate angle based on whether the larger value used in the comparison step is the vertical edge or the horizontal edge. In addition, the angle may be positive or negative. If the signs of the horizontal gradient and vertical gradient are the same, the angle is likely to be positive, otherwise it is likely to be negative. The determination of whether the angle is positive or negative may also be made using edge masks, described below with reference to FIGS. 5A and 5B.

In the exemplary embodiment at step 280, the unique edge masks that are described below may be used both to identify positive and negative angles and to compensate for pixels that were erroneously categorized as edges but which represent image noise or small edge regions that can not be handled properly by the edge interpolator. The use of edge masks as filters is well-suited for interlaced scan images, to ensure that the interpolated pixel(s) correspond to the intended visual image. Step 280 of FIG. 3 represents processing performed by the edge filtering block 140, shown in FIG. 2A. In step 290, the value of the target pixel may be provided and an edge detection flag may be set. Step 290 represents processing performed by block 150 of FIG. 2A.

Figure 2B:
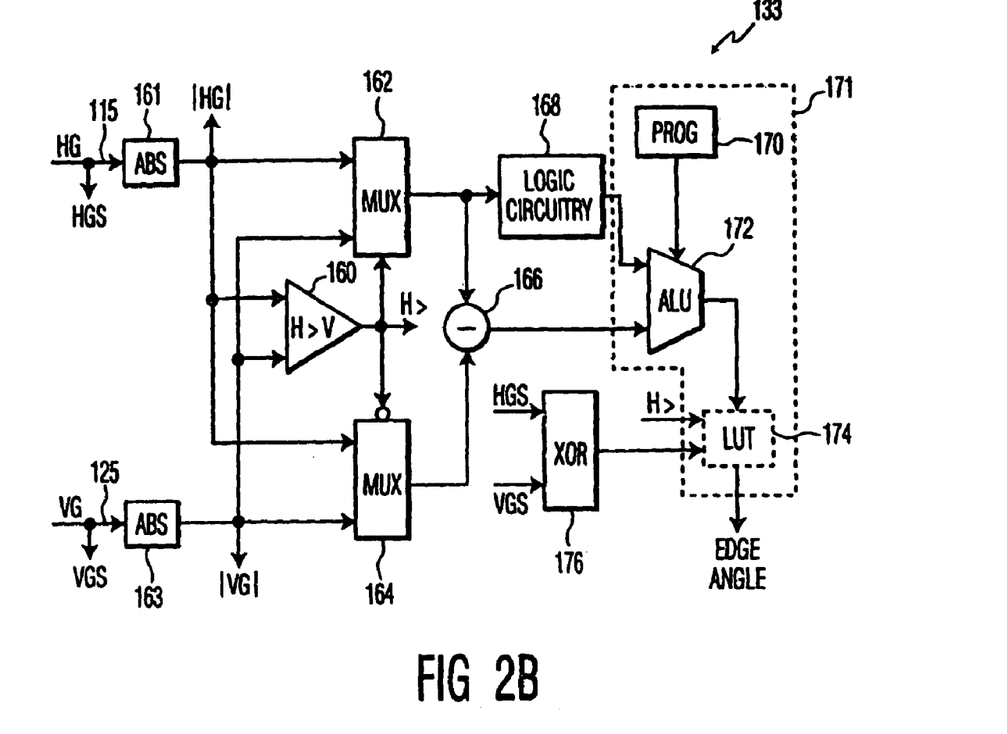
FIGS. 2B and 2C are block diagrams partly in logic diagram form of edge determination combinational logic suitable for use in the embodiment of the invention shown in FIG. 2A.
Figure 2C:
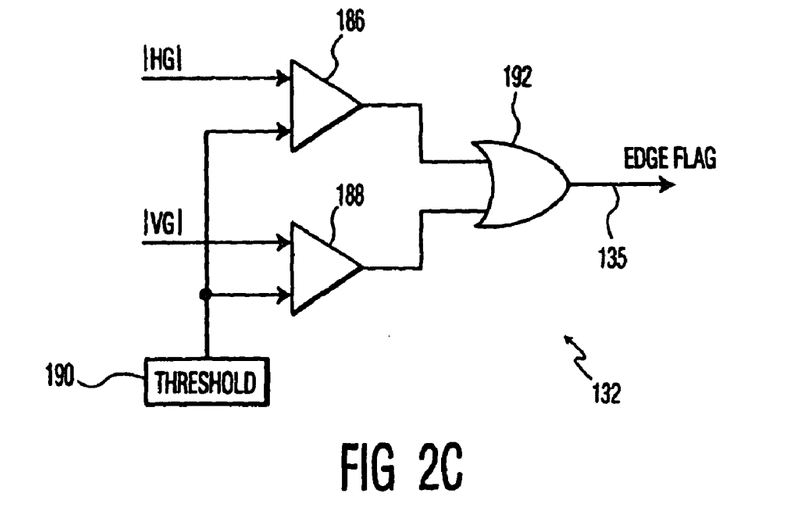

FIGS. 2B and 2C are block diagrams of circuitry suitable for use as the edge determination combinational logic 130. FIG. 2B is an example of edge angle determining combinational logic and FIG. 2C is an example of edge determination logic. As shown in FIG. 2B, the horizontal gradient, HG, 115 and vertical gradient, VG, 125 are applied to respective absolute value circuits 161 and 163 that produce magnitude signals |HG| and |VG| which are applied to corresponding input terminals of respective multiplexers 162 and 164. The sign bits, HGS and VGS, of the horizontal gradient and the vertical gradient values respectively are made available as separate signals.

The signals |HG| and |VG| are also applied to a comparator 160. The comparator 160 produces an output signal H> which is logic-high when the magnitude of the horizontal gradient 115 is greater than the magnitude of the vertical gradient 125. This output signal is applied to the selection input terminal of multiplexer 162 and to an inverted selection input terminal of multiplexer 164. Consequently, the output signal of multiplexer 162 is always the greater magnitude value of the horizontal gradient 115 and the vertical gradient 125 while the output signal of multiplexer 164 is always the lesser magnitude value. The output signal of multiplexer 162 is applied to the minuend input port of a subtractor 166 while the output signal of multiplexer 164 is applied to the subtrahend input port of the subtractor. Thus, the subtractor provides the difference between the horizontal gradient and vertical gradient. This signal is applied to one input port of an arithmetic and logic unit (ALU) 172. The greater gradient value provided by multiplexer 162 is applied to logic circuitry 168 which determines the most significant non-zero bit position of the greater value. This bit value is applied to a second input port of the ALU 172.

As described above, the ALU 172 multiplies the binary value in the bit position indicated by the logic circuitry 168 in the difference value provided by the subtractor 166 and the values in N less significant bit positions by decreasing powers of 2. (i.e. 0.5, 0.25, 0.125, etc.) and sums the result. In an alternative embodiment of the invention, logic circuitry 168 examines bit positions less significant than the output bit position and provides a second value (not shown) to the ALU 172 which causes the ALU 172 to select one coefficient set from among several coefficient sets and multiply the values in the bit positions of the difference value by the selected coefficients. The results of these multiplication are also summed. The operation of the ALU 172 is controlled by a program in a program memory 170.

When the selected bits of the difference value are multiplied by decreasing powers of two, the output value provided by the ALU 172 represents the tangent of the angle of the edge. This value may be applied to a look-up-table (LUT) 174 to be converted into an angle. When the coefficient sets are used, the value provided by the ALU 172 is the angle of the edge so the LUT 174 is not needed.

As described above, the angle provided by the ALU 172 and/or LUT 174 is less than 45°. If the horizontal gradient value 115 is greater than the vertical gradient value 125, the angle should be greater than 45°. Accordingly, in the exemplary embodiment, the signal H> is also applied to the LUT 17 so that it can produce angles that are both greater than and less than 45°. The signal H> is provided by the comparator 160, as described above. The exclusive OR gate 176 determines whether the angle of the edge is negative or positive. The sign bits, HGS and VGS of the respective horizontal gradient value 115 and vertical gradient value 125 are applied to the input terminals of the exclusive OR gate 176. If these two values are the same, then the angle is positive. If these values differ, the angle is negative. The output signal of the exclusive OR gate 176 is also applied to the LUT 174 so that it may produce both positive and negative angles.

If the ALU 172 uses the coefficient sets to determine the angle of the edge and the LUT 174 is not used, the ALU may provide, for example, the two least significant bit positions of the angle value, the value of the signal H> may be the next more significant bit and the output signal of the exclusive OR gate 176 may be the sign bit. These values are illustrated in Table 2 below. In this exemplary configuration, the angle values are represented in sign-magnitude format.

FIG. 2C is a block diagram of exemplary edge detection circuitry. This circuitry includes two comparators 186 and 188 and an OR gate 192. The comparators 186 and 188 compare the signal |HG|, the magnitude of the horizontal gradient value 115, and the signal |VG|, the magnitude of the vertical gradient value 125 to a threshold value 190. If either of these values exceeds the threshold value (e.g. 32), the comparator produces a logic-high output signal. The output signals of the comparators 186 and 188 are applied to the OR gate 192 and the output signal of the OR gate is the edge flag signal 135, shown in FIG. 2A.

Figure 4:
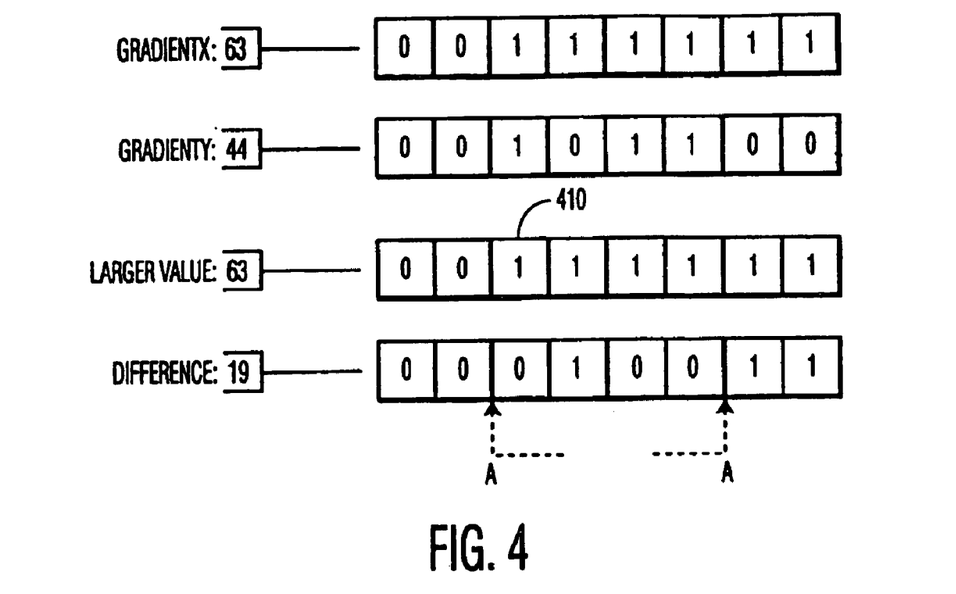
FIG. 4 is a data diagram that is useful for describing an angle calculation according to an exemplary embodiment of the present invention.

An example according to the exemplary embodiment of the present invention is shown in FIG. 4. For purposes of the example, the horizontal edge detector and vertical edge detector filters have generated the binary values (shown in FIG. 4 as "GradientX" and "GradientY" respectively) for a target pixel. For the purpose of the example, these values have been determined to be greater than the predetermined threshold. In this example, the horizontal edge strength value is 63, or x"00111111." The vertical edge strength value is 44, or x"00101100" and the threshold value is 32. The difference between the horizontal and vertical edge strengths is 19, or x"00010011." The most significant non-zero bit of the larger gradient intensity value (in this case, the horizontal gradient intensity value) is the third position from the left. The value of the corresponding position in the difference bit string is x"0". For the example shown, accuracy is desired to 4 bit positions, so the relevant substring of the difference bit string is x"0100". Multiplying the value of each position by the decreasing powers of 2 and summing the results as described above yields $(0*0.5)+(1*0.25)+(0*0.125)+(0*0.0625)=0.25$. Subtracting this result from 1.0 results in an estimate of 0.75. Finishing the calculation according to the present invention, but not shown in the example in FIG. 4, the inverse tangent of 0.75 (calculated, for example, using a look-up table) yields an angle of approximately 36 degrees. In the exemplary embodiment of the invention, this angle maybe approximated as 30 degrees. Although this method can generate accurate results, there may be instances where greater accuracy may be desired. In these instances, processing a larger number of bits for each edge strength value provides the desired improvement in accuracy.

Figure 6A:
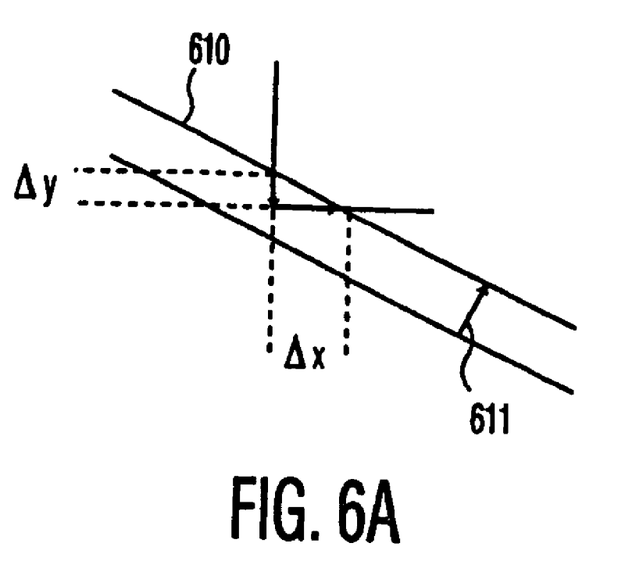
FIGS. 6A, 6B, 6C and 6D are image edge diagrams that are useful for describing an angle calculation suitable for use with the present invention.
Figure 6B:
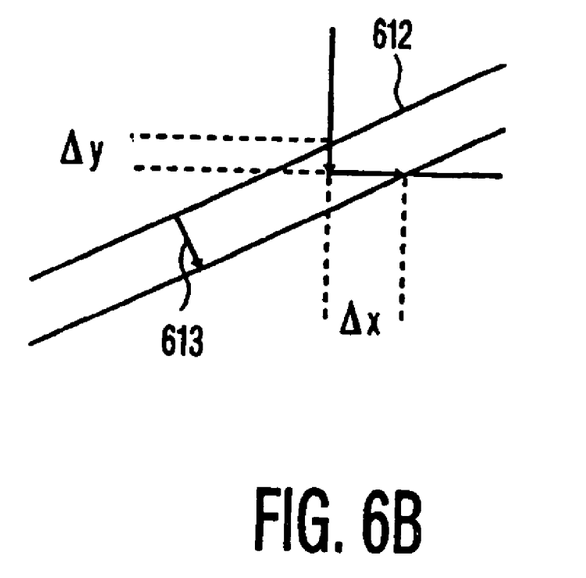
Figure 6C:
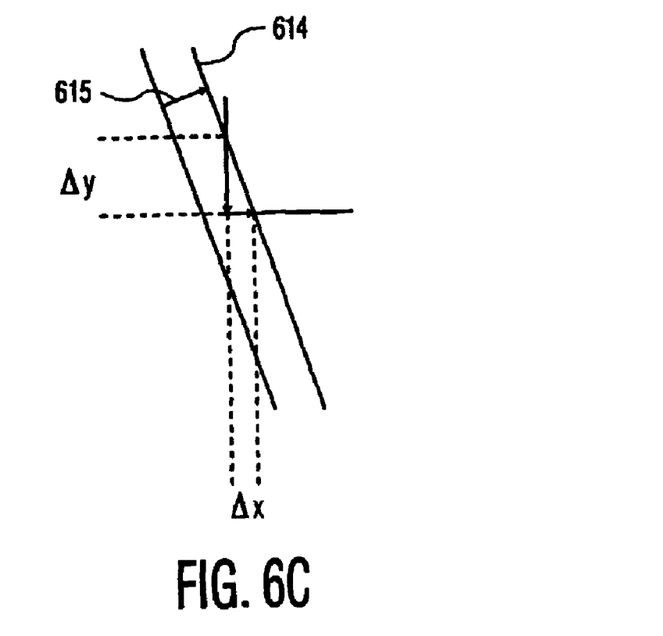
Figure 6D:
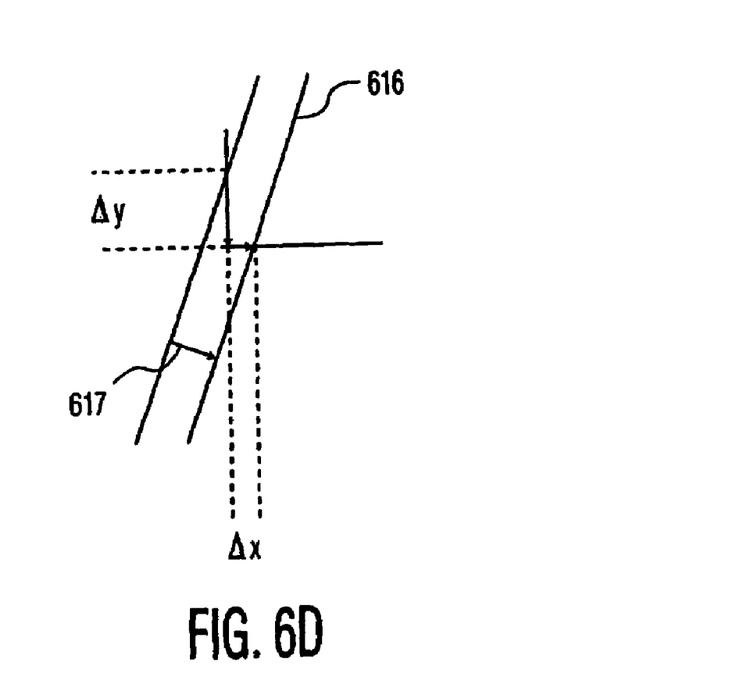

FIGS. 6A through 6D are image diagrams showing edges 610, 612, 614 and 616, respectively. Each of the edges is shown as a double line to indicate regions in which a gradient exists. The arrows 611, 613, 615 and 617 indicate increasing pixel values. FIG. 6A shows an edge having a negative angle less than 45°, FIG. 6B shows an edge having a positive angle less than 45°, FIG. 6C shows an edge having a negative angle greater than 45° and FIG. 6D shows an edge having a positive angle greater than 45°. As shown in the figures, the signs of the horizontal gradients (ΔX) and vertical gradients (ΔY) are the same for positive angles and are different for negative angles. Thus, the relative signs of the gradient values can be used to determine the sense, positive or negative, of the angle formed by the edge.

As described above, in one embodiment of the invention, the angle of the edge may be calculated directly from the edge strength values, without using the look-up table. As described below, this may be done in the combinational logic 133 with minimal additional processing. Because the larger values (i.e., the values closer to the selected most significant bit) can vary within a power of 2, the evaluation of the bit patterns of the difference bits may also vary. An effective and accurate way to approximate this variance is to evaluate the middle two bits of the larger gradient, and select one of three ranges; essentially indicating if the larger value is closer to $2^N$, $2^{N-1}$, or somewhere in the middle. A simple truth table of patterns indicates this:

x"11" close to $2^N$ x"01" in the middle between $2^N$ and $2^{N-1}$ x"10" in the middle between $2^N$ and $2^{N-1}$ x"00" close to $2^{N-1}$ Table 1 lists the sets of coefficients that indicate the interpretation of the bits for each of these cases.

TABLE 1

| Bit Pattern | First bit position | Second bit position | Third bit position | Fourth bit position |
|---|---|---|---|---|
| x"11" | .5 | .25 | .125 | .06 |
| x"10" | .75 | .38 | .19 | .095 |
| x"01" | .75 | .38 | .19 | .095 |
| x"00" | 1.0 | .5 | .25 | .125 |

When the result is subtracted from one, the first two-bits of the output value define the angle as being closer to 0 degrees (x"00"), 22.5 degrees (x"01"), 30 degrees (x"10") or 45 degrees (x"11"). A third bit, more significant bit is set if the horizontal edge strength value is larger and reset otherwise. The sign bit is set if the horizontal edge strength value and vertical edge strength values have opposite signs and is reset otherwise. This provides approximations of the edge angles shown in Table 2.

TABLE 2

| Quantized value | Angle |
|---|---|
| x"0000" | 0° |
| x"0001" | 22.5° |
| x"0010" | 30° |
| x"0011" | 45° |
| x"0110" | 60° |
| x"0101" | 67.5° |
| x"0100" | 90° |
| x"1001" | −22.5° |
| x"1010" | −30° |
| x"1011" | −45° |
| x"1110" | −60° |
| x"1101" | −67.5° |

Although angles can be determined efficiently with this method using LUTs and summing techniques, an even simpler approach can be used in cases where the number of angles to be determined is limited. If only a small number of angles are to be determined, selected bits from the difference value may be applied to minimized combinational logic that produces an output value corresponding to each angle; this contrast with LUTs, which span every possible bit combination, allowing as many unique angles as bit patterns.

The first step in this process is to tabulate each possible bit pattern (16 bit patterns when 4 bits are used), and interpret the value of each pattern according to the coefficients in Table 1 to determine the corresponding angle. Angles (and their corresponding bit patterns) close to desired angles are grouped together, and using standard minimization techniques well known to those skilled in the art (e.g. Karnaugh maps, etc.), a small combinational logic circuit is determined. For example, using the top set of coeficents, the bit pattern "0011" corresponds to an angle of 36 degrees, the bit pattern "0100" to an angle of 32 degrees, and the bit pattern "0101" to an angle of 28 degrees. These patterns may be combined to represent a 30 degree angle. In the same way, each additional angle is associated with a set of bit patterns. Using the sets of patterns corresponding to angles, along with the set remaining patterns classified to angles of no interest, minimization techniques may be applied to determine minimized combinational logic circuitry for each angle. In the exemplary embodiment of the invention, this optimized combinational logic is represented by the dashed-line box 171 which replaces the ALU 170, program memory 172 and LUT 174 in FIG. 2B.

Although the combinatorial logic approach has merits for some applications, in cases where many different angles are to be distinguished LUTs, or explicit summing may be a more efficient realization.

Figure 5A:
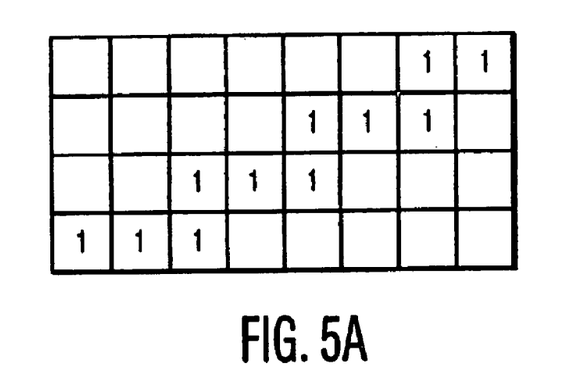
FIGS. 5A and 5B are exemplary edge masks that may be used in an exemplary embodiment of the present invention.
Figure 5B:
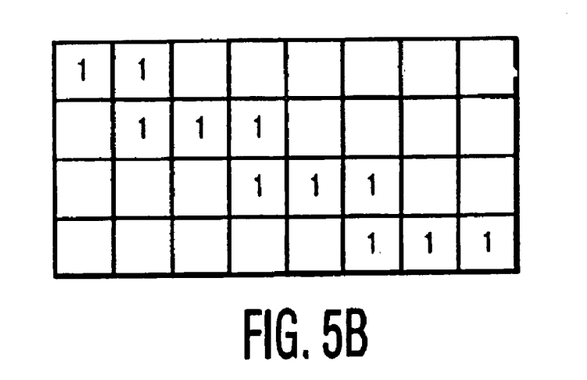

Determination of the presence of edges at each position gives rise to an edge map. Because edges are essentially derivative operators, edge maps tend to be noisy and may contain many 'false' edges that do not belong to a distinct image boundary. In addition, edges having a relatively small number of pixels may be defined. These edges are difficult to process using an edge interpolator as the interpolator uses a certain kernel size to calculate the interpolated value. For this reason, the edge map is passed through a spatial filtering algorithm that eliminates noise pixels and edges that are too small to process efficiently using the edge interpolator. As described above, the edge filters also distinguish between positive and negative angles. Examples of edge filters used by the exemplary embodiment of the present invention are shown in FIGS. 5A and 5B. The spatial filtering algorithm utilizes these shaped edge filters, which roughly follow the direction of pre-selected angles (separate filters are used for negative and positive angles) to determine if an edge pixel is along a visually distinct edge region.

In the exemplary embodiment of the invention, only two filters are used, corresponding to angles of 45° and −45°, respectively. It is contemplated, however, that edge filters corresponding to other angles may be used in addition to or in place of these filters.

The use of edge filters is well-suited for interlaced scan images, to ensure that the interpolated pixel(s) correspond to the intended visual image. Edge filters, according to the present invention, are masks of various pre-selected angles, encompassing 3 or more rows (corresponding to at least the 2 interlaced scan rows and the 1 interpolated row). Each mask is the pixel pattern of a pre-selected angle across a predetermined number of rows. Each of the edge filters 140 may operate for example as a matched filter. If the image pixels or edge map conforms to the edge filter a relatively large output value is produced. The amplitude of the output value varies with the match between the filter and the edge as represented in the edge map. The filters discriminate between positive and negative angles because the 45° edge filter produces a larger response for an edge having a positive angle than for an edge having a negative angle and the −45° edge filter produces a larger response for edges having a negative angle than for edges having a positive angle.

In one exemplary embodiment of the invention, only negative-angle edges are applied to the negative angle filter and only positive-angle edges are applied to the positive angle filter. In this embodiment, if the appropriate filter does not produce a relatively large output value, then the pixel is determined not to be an edge pixel.

In an alternative embodiment, all edge pixels are filtered by all of the edge filters. If the output value provided by at least one of the filters exceeds a threshold value (i.e., indicates an approximate match between the filter and the edge map at that pixel position), then the pixel is likely to be an actual edge pixel. If no match is found among the edge filters, then the pixel is not an edge pixel but an artifact of noise in the image and the edge flag is reset. As described above, the edge filters may also be used to determine the sense of an edge. If, for example, a negative edge pixel produces a relatively high output value from the positive edge filter but a relatively low output value from the negative edge filter, then, in one embodiment of the invention, the sense of the edge may be changed from negative to positive. If, however, a pixel produces relatively high output values from both the positive edge filter and the negative edge filter, it is likely the pixel is not an edge pixel and its edge flag is reset.

After filtering, pixels that are determined to be part of a continuous edge are interpolated along that edge to maintain sharpness in the progressive output image.

The value of the target pixel may be calculated, for example, by averaging the values of two pixels lying along the calculated angle of the edge, in scanned rows adjacent to the target pixel. The value of the target pixel is provided as the interpolated pixel value. The edge interpolator 150 provides both the actual value of the interpolated edge pixel and a flag indicating that the value is an edge pixel.

In one exemplary embodiment of the invention, only the edge value for the calculated edge sense is provided by the edge interpolator when the edge angle is determined. In a first alternative embodiment, two values may be calculated for each edge pixel as soon as the edge angle is determined: one value for the positive angle and the other value for the negative angle. A selection between these two values may be made after the edge map has been processed through the edge filters shown in FIGS. 5A and 5B. In another alternative embodiment, the edge angle may be stored for each pixel and the interpolated pixel calculated only after the edge pixels or corresponding edge map entries have been processed through the edge filters to confirm the angle of the edge as positive or negative.

In alternate exemplary embodiments, the present invention can generate edge pixels in parallel or sequentially with the processing of other components of a progressive scanning conversion apparatus, depending on the apparatus with which it is used. If the former, the several flags and intermediate values may be passed to and from the other components of the progressive scan conversion apparatus for processing, and components of the present invention may be utilized as appropriate. If the latter, the present invention may implement some or all of the described steps and components, as desired.

Although the invention has been described in terms of a mixed hardware and software embodiment, it is contemplated that it may be practiced entirely in hardware or entirely in software. A software embodiment of the invention or the software component of a mixed hardware and software embodiment may be implemented on a computer readable carrier such as a memory card, a magnetic or optical disc or an audio-frequency, radio-frequency or optical carrier wave.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A method for generating an interpolated picture element (pixel) at a target pixel position between two successive lines of an interlace scan image, comprising the steps of:

determining a first gradient intensity value in a first direction in a predetermined region about the target pixel position and a first magnitude value for the determined first gradient intensity value;

determining a second gradient intensity value in a second direction in the predetermined region about the target pixel position, the second direction being different from the first direction, and a second magnitude value for the determined second gradient intensity value;

determining if at least one of the first magnitude value and the second magnitude value exceeds a predetermined threshold to define the target pixel location as an edge pixel location;

if the target pixel location is an edge pixel location,
  determining a ratio of the first and second gradient intensity values including the step of identifying one of the first and second magnitude value as being larger than the other magnitude value;
  processing the ratio of the first and second gradient intensity values to determine an approximate angle of the edge by reflecting the edge angle about a predetermined reference angle if the first magnitude value is greater than the second magnitude value, and comparing the first and second gradient intensity values and changing the angle of the edge in sense from positive to negative if first and second gradient intensity values are opposite in sense; and if the target pixel location is an edge pixel location, interpolating a value for the target pixel location from the values of pixels in the interlace scan image adjacent to the target pixel and lying along the determined approximate angle.

2. A method according to claim 1, wherein
the step of determining the ratio of the first and second gradient intensity values includes the steps of:
  calculating a difference value between the larger magnitude value and the other magnitude value;
  representing as bit strings said first and second magnitude values and the difference value;
  identifying a most significant non-zero bit position in the bit string representing the larger magnitude value; and
  identifying a bit position in the bit string representing the difference value, the identified bit position corresponding to the bit position identified in the bit string representing the larger gradient intensity value;
  dividing a binary value at the identified bit position in the bit string representing the difference between said first and second gradient intensity values, and a predetermined number of less significant bit positions, by respective increasing powers of two to produce respective results, and summing the results to produce a sum;
  subtracting the sum from unity to generate the ratio, wherein the ratio is a tangent value; and
the step of processing the ratio of the first and second gradient intensity values to determine an approximate angle of the edge includes the step of applying the tangent value to an inverse tangent function to determine the approximate angle of the edge.

3. A method according to claim 1, further including the steps of:
  generating an edge map including a plurality of pixel locations that have been determined to define edges;
  filtering the edge map using first and second edge filters, the first edge filter corresponding to edges having positive angles and the second edge filter corresponding to edges having negative angles; and
  determining the angle of the edge at the target pixel position to be a negative angle if the output signal of the second edge filter produces a larger output signal than the first edge filter at the target pixel position.

4. A method according to claim 1, further including the steps of:
  filtering the interlace scan image using first and second edge filters, the first edge filter corresponding to edges having positive angles and the second edge filter corresponding to edges having negative angles; and
  determining the angle of the edge at the target pixel position to be a negative angle if the output signal of the second edge filter produces a larger output signal than the first edge filter at the target pixel position.

5. A method according to claim 1 in which the step of processing the ratio of the first and second gradient intensity values includes the step of applying the tangent value to combinational logic which is configured to approximate the inverse tangent function.

6. A method according to claim 5, wherein the step of processing the ratio of the first and second gradient intensity values to determine the angle of the edge further includes the step of reflecting the edge angle about a predetermined reference angle if the first magnitude value is greater than the second magnitude value.

7. A method according to claim 5, further including the step of comparing the first and second gradient intensity values and changing the angle of the edge in sense from positive to negative if the first and second gradient intensity values are opposite in sense.

8. A method according to claim 5, further including the steps of:
  generating an edge map including a plurality of pixel locations that have been determined to define edges;
  filtering the edge map using first and second edge filters, the first edge filter corresponding to edges having positive angles and the second edge filter corresponding to edges having negative angles; and
  determining the angle of the edge at the target pixel position to be a negative angle if the output signal of the second edge filter produces a larger output signal than the first edge filter at the target pixel position.

9. A method for generating an interpolated picture element (pixel) at a target pixel position between two successive lines of an interlace scan image, comprising the steps of:
  determining a first gradient intensity value in a first direction in a predetermined region about the target pixel position and a first magnitude value for the determined first gradient intensity value;
  determining a second gradient intensity value in a second direction in the predetermined region about the target pixel position, the second direction being different from the first direction, and a second magnitude value for the determined second gradient intensity value;
  determining if at least one of the first magnitude value and the second magnitude value exceeds a predetermined threshold to define the target pixel location as an edge pixel location;
  if the target pixel location is an edge pixel location,
    identifying one of the first and second magnitude values as a larger value and calculating a difference between the first and second magnitude values;
    comparing the first and second gradient intensity values to determine an approximate angle for the edge by reflecting the edge angle about a predetermined reference angle if the first magnitude value is greater than the second magnitude value;

changing the angle of the edge in sense from positive to negative if the first and second gradient intensity values are opposite in sense;

representing as bit strings said first and second magnitude values and the difference between said first and magnitude values;

identifying a most significant non-zero bit position in the bit string representing the larger magnitude value;

identifying a bit position in the bit string representing the difference between said first and second magnitude values, the identified bit position corresponding to the bit position identified in the bit string representing the larger magnitude value;

selecting one coefficient set from among a plurality of coefficient sets responsive to the larger magnitude value, each coefficient set including a plurality of coefficient values;

multiplying each one-bit value corresponding to the identified bit position in the bit string representing the difference between said first and second magnitude values, and a predetermined number or less significant bit positions, by respectively different ones of the coefficient values in the selected coefficient set to produce a plurality of results;

summing the plurality of results to determine the angle of the edge; and combining pixels lying along the determined angle to generate the interpolated pixel.

10. A method according to claim 9, further including the steps of:

generating an edge map including a plurality of pixel locations that have been determined to define edges;

filtering the edge map using first and second edge filters, the first edge filter corresponding to edges having positive angles and the second edge filter corresponding to edges having negative angles; and determining the angle of the edge at the target pixel position to be a negative angle if the output signal of the second edge filter produces a larger output signal than the first edge filter at the target pixel position.

11. Apparatus for generating an interpolated picture element (pixel) at a target pixel position between two successive lines of an interlace scan image, comprising:

a first filter configured to filter successive lines of the interlace scan image in a region about the target pixel position to generate a first gradient intensity value having a first magnitude value and a first sense value;

a second filter configured to filter successive lines of the interlace scan image in a region about the target pixel position to generate a second gradient intensity value having a second magnitude value and a second sense value, wherein the second gradient intensity value is with respect to a different angle than the first gradient intensity value;

a comparator which determines if at least one of the first magnitude value and the second magnitude value exceeds a predetermined threshold to define the target pixel location as being an edge pixel location;

combinational logic that combines the first and second gradient intensity values to determine an angle for the edge, wherein the combinational logic includes:

a comparator that compares the first and second magnitude values to identify a larger magnitude value and a smaller magnitude value;

a subtractor that subtracts the smaller magnitude value from the larger magnitude value to generate a difference value, wherein at least the larger magnitude value and the difference value are represented as bit-strings; and logic circuitry, coupled to receive the larger magnitude value which identifies a most significant non-zero bit position in the larger magnitude value;

arithmetic circuitry that uses the first and second gradient intensity values to calculate an approximate angle for the edge; and an interpolator that combines values of pixels in the interlace scan image adjacent to the target pixel and lying along the determined angle to generate the interpolated pixel.

12. Apparatus according to claim 11 wherein the arithmetic circuitry includes:

circuitry which divides a one-bit value at the identified bit position in the bit string representing the difference value, and a predetermined number of less significant bit positions, by respective increasing powers of two to produce respective results; and which sums the results and subtracts the sum from unity to generate a tangent value; and a look-up-table which is programmed to return the angle of the edge in response to the tangent value.

13. Apparatus according to claim 12, wherein the look-up table is responsive to a signal indicating that the first magnitude value is greater than the second magnitude value for reflecting the angle of the edge about a predetermined reference angle.

14. Apparatus according to claim 13, wherein the look-up table is responsive to a signal indicating that the first sense value is different from the second sense value for changing the angle of the edge from positive to negative.

15. Apparatus according to claim 13 further comprising:

an edge map memory configured to hold a binary value for each pixel position, wherein pixel positions in the edge map memory that have been determined to define edges are assigned a first value and pixel positions that have not been determined to define edges are assigned a second value, different from the first value;

a first edge filter corresponding to edges having negative angles which filters the edge map to produce a negative angle output value; and a second edge filter corresponding to edges having positive angles which filters the edge map to produce a positive angle output value.

16. Apparatus according to claim 13, further comprising:

a first edge filter corresponding to edges having negative angles which filters the interlace scan image to produce a negative angle output value; and a second edge filter corresponding to edges having positive angles which filters the interlace scan image to produce a positive angle output value.

17. Apparatus according to claim 11 wherein the combinational logic includes:

a selector, responsive to the larger magnitude value for selecting a single coefficient set from among a plurality of coefficient sets, each coefficient set including a plurality of coefficient values; and the arithmetic circuitry includes circuitry which multiplies a one-bit value at the identified bit position in the bit string representing the difference value, and a predetermined number of less significant bit positions, by respectively different ones of the plurality of coefficient values in the selected coefficient set; and which sums the results to determine the angle of the edge.

18. Apparatus according to claim 17, wherein the combinational logic further includes a further comparator that generates a one-bit value which has a first value if the first magnitude value is greater than the second magnitude value and has second value, different from the first value if the first magnitude value is not greater than the second magnitude value, wherein the generated one-bit value is concatenated with the determined angle of the edge to represent angles greater than and less than a predetermined reference angle.

19. Apparatus according to claim 18, wherein the combinational logic further includes further logic circuitry that generates a further one-bit value which has a first value if the first sense value is different from the second sense value, wherein the further one-bit value is concatenated with the determined angle as a sign bit.

20. Apparatus according to claim 18 further comprising:
an edge map memory configured to hold a binary value for each pixel position, wherein pixel positions in the edge map memory that have been determined to define edges are assigned a first value and pixel positions that have not been determined to define edges are assigned a second value, different from the first value;
a first edge filter corresponding to edges having negative angles which filters the values held in the edge map memory to produce a negative angle output value; and
a second edge filter corresponding to edges having positive angles which filters the values held in the edge map memory to produce a positive angle output value.

21. Apparatus according to claim 18, further comprising:
a first edge filter corresponding to edges having negative angles which filters the interlace scan image to produce a negative angle output value; and
a second edge filter corresponding to edges having positive angles which filters the interlace scan image to produce a positive angle output value.

22. Apparatus according to claim 11 wherein the combinational logic further includes:
further logic circuitry, responsive to the identified bit position in the difference value and a plurality or less significant bit positions in the difference value to produce a multi-bit output value representing the angle of the edge.

23. Apparatus according to claim 22, wherein the combinational logic further includes a further comparator that generates a one-bit value which has a first value if the first magnitude value is greater than the second magnitude value and has second value, different from the first value if the first magnitude value is not greater than the second magnitude value, wherein the generated one-bit value is concatenated with the multi-bit value representing the angle of the edge to represent angles greater than and less than a predetermined reference angle.

24. Apparatus according to claim 23, wherein the combinational logic further includes additional logic circuitry that generates a further one-bit value which has a first value if the first sense value is different from the second sense value, wherein the further one-bit value is concatenated with the multi-bit value representing angles greater than and less than the predetermined reference angle as a sign bit.

25. A tangible computer readable carrier including computer program instructions, the computer program instructions causing a computer to perform the method of claim 1.

26. A computer readable carrier according to claim 25, wherein:
the computer program instructions that cause the computer to perform the step of determining the ratio of the first and second gradient intensity values cause the computer to perform the steps of:
identifying one of the first and second magnitude values as being larger than the other magnitude value and calculating a difference value between the larger magnitude value and the other magnitude value;
representing as bit strings said first and second magnitude values and the difference value;
identifying a most significant non-zero bit position in the bit string representing the larger magnitude value;
identifying a bit position in the bit string representing the difference value, the identified bit position corresponding to the bit position identified in the bit string representing the larger gradient intensity value;
dividing a binary value at the identified bit position in the bit string representing the difference between said first and second gradient intensity values, and a predetermined number of less significant bit positions, by respective increasing powers of two to produce respective results, and summing the results to produce a sum; and
subtrading the sum from unity to generate a tangent value; and
the computer program instructions that cause the computer to perform the step of processing the ratio of the first and second gradient intensity values, cause the computer to perform the step of:
applying the tangent value to an inverse tangent function to determine the angle of the edge.

* * * * *